United States Patent [19]

Kinoshita et al.

[11] Patent Number: 5,140,618
[45] Date of Patent: Aug. 18, 1992

[54] FRAME SYNCHRONIZATION CIRCUIT

[75] Inventors: Osamu Kinoshita, Kawasaki; Takako Mori, Fujisawa; Hideki Ishibashi; Hiroyuki Ibe, both of Yokohama; Takehiko Atsumi, Ichikawa, all of Japan

[73] Assignee: Kabushiki Kaisha Toshiba, Kawasaki, Japan

[21] Appl. No.: 651,013

[22] Filed: Feb. 5, 1991

[30] Foreign Application Priority Data

Feb. 22, 1990 [JP] Japan .................................. 2-39857

[51] Int. Cl.$^5$ ........................ H04L 07/00; H04J 03/06
[52] U.S. Cl. ..................................... 375/116; 375/106
[58] Field of Search ..................... 375/114, 116, 106; 370/105.4, 106, 108; 364/715.11

[56] References Cited

U.S. PATENT DOCUMENTS 4,748,623 5/1988 Fujimoto .............................. 375/114
4,920,546 4/1990 Iguchi et al. ......................... 375/106

FOREIGN PATENT DOCUMENTS 0091061 10/1983 European Pat. Off. .
0285158 10/1988 European Pat. Off. .
50-102206 8/1975 Japan .
63245032 3/1987 Japan .
63107247 6/1987 Japan .

OTHER PUBLICATIONS

Patent Abstracts of Japan, vol. 13, No. 53, (E-713) [3401], Feb. 7, 1989; & JP-A-63 245 032 (Fujitsu) Dec. 10, 1988.

Primary Examiner—Benedict V. Safourek
Assistant Examiner—Temesghen Ghebretinsae
Attorney, Agent, or Firm—Oblon, Spivak, McClelland, Maier & Neustadt

[57] ABSTRACT

In a frame synchronization circuit, a serial data signal, which includes a frame synchronization code constituted by an M number of bits in one frame, is converted by a serial/parallel converting circuit to a parallel data signal of a $2M-1$ number of bits. An M number of pattern detectors of a first synchronization detecting circuit detect the code pattern of the first block of the frame synchronization code from the parallel data signal. A selection signal generating circuit holds outputs of the pattern detectors, and outputs them as a selection signal designating the bit position allotted to the pattern detector which detects the synchronization code pattern. An output of the serial/parallel converting circuit is delayed by a time required for the above-mentioned processing, and supplied to a selector, which selectively outputs an M-bit data signal corresponding to the bit position designated by the selection signal.

3 Claims, 12 Drawing Sheets

|  | φ1 | φ2 | φ3 | φ4 | φ5 | φ6 | φ7 | φ8 |
|---|---|---|---|---|---|---|---|---|
| P1 | 1 | X | X | X | X | X | X | X |
| P2 | 1 | 1 | X | X | X | X | X | X |
| P3 | 1 | 1 | 1 | X | X | X | X | X |
| P4 | 1 | 1 | 1 | 1 | X | X | X | X |
| P5 | 0 | 1 | 1 | 1 | 1 | X | X | X |
| P6 | 1 | 0 | 1 | 1 | 1 | 1 | X | X |
| P7 | 1 | 1 | 0 | 1 | 1 | 1 | 1 | X |
| P8 | 0 | 1 | 1 | 0 | 1 | 1 | 1 | 1 |
| P9 | X | 0 | 1 | 1 | 0 | 1 | 1 | 1 |
| P10 | X | X | 0 | 1 | 1 | 0 | 1 | 1 |
| P11 | X | X | X | 0 | 1 | 1 | 0 | 1 |
| P12 | X | X | X | X | 0 | 1 | 1 | 0 |
| P13 | X | X | X | X | X | 0 | 1 | 1 |
| P14 | X | X | X | X | X | X | 0 | 1 |
| P15 | X | X | X | X | X | X | X | 0 |

F I G. 4

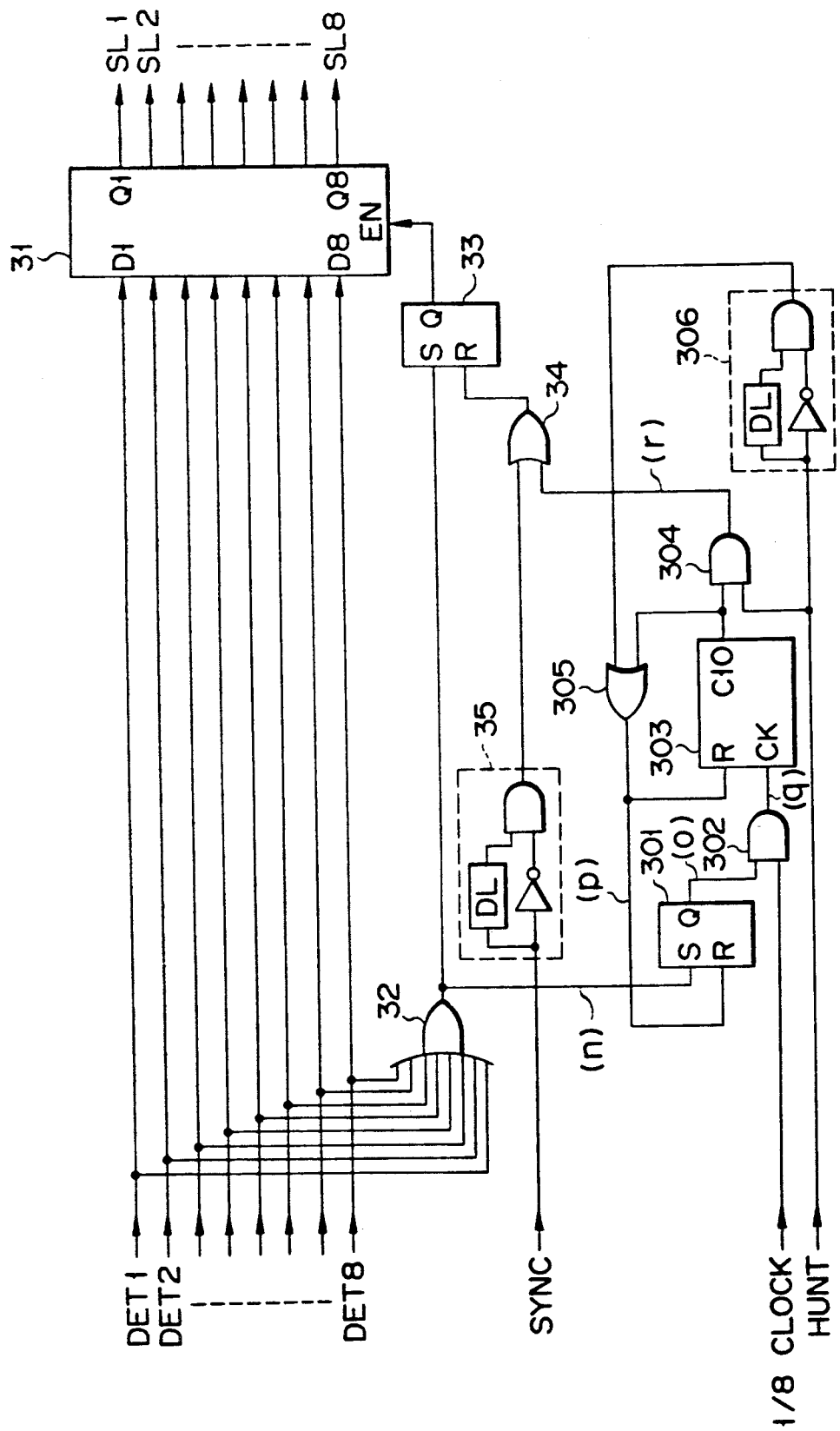
F I G. 5

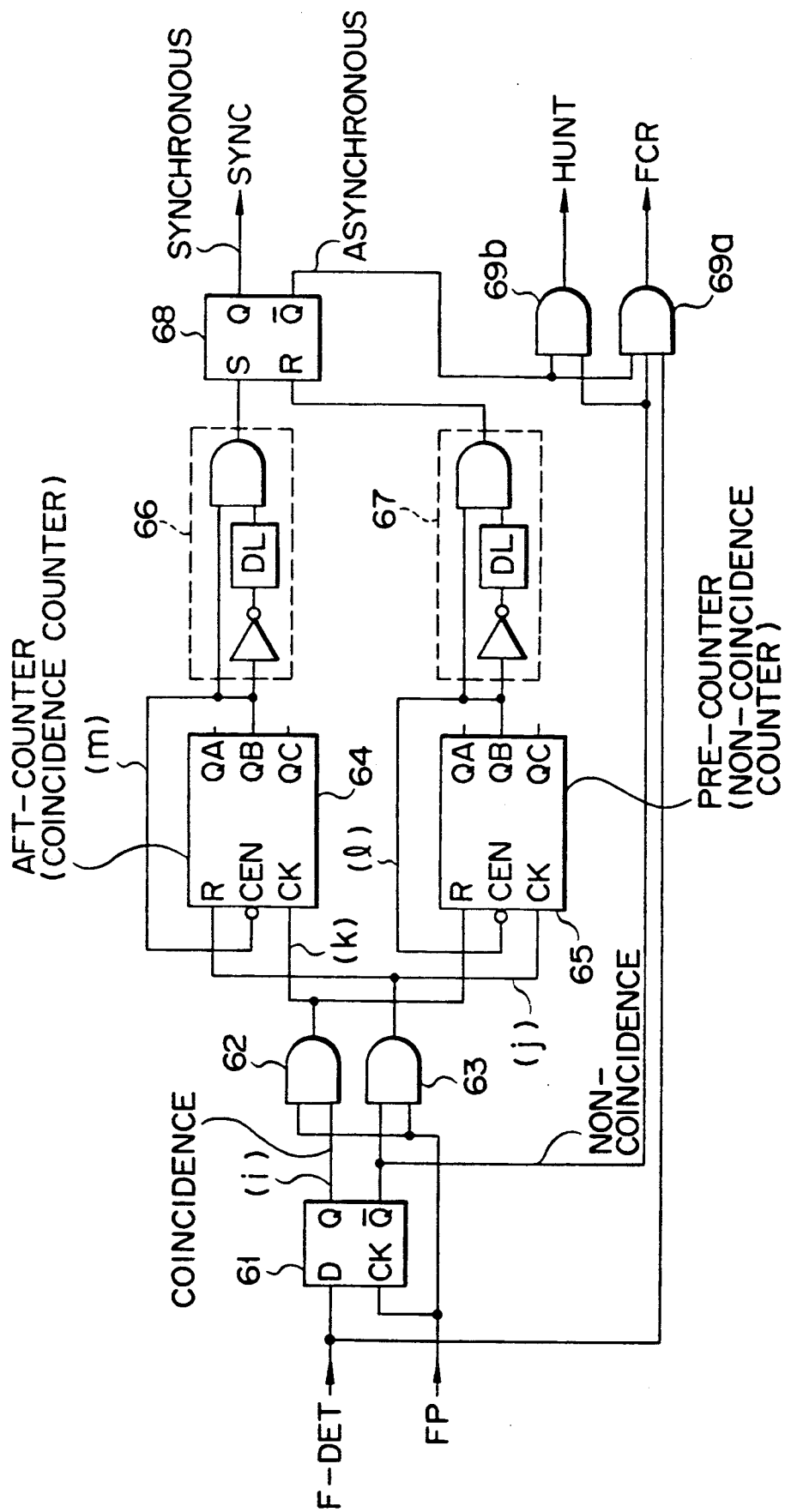
F I G. 9

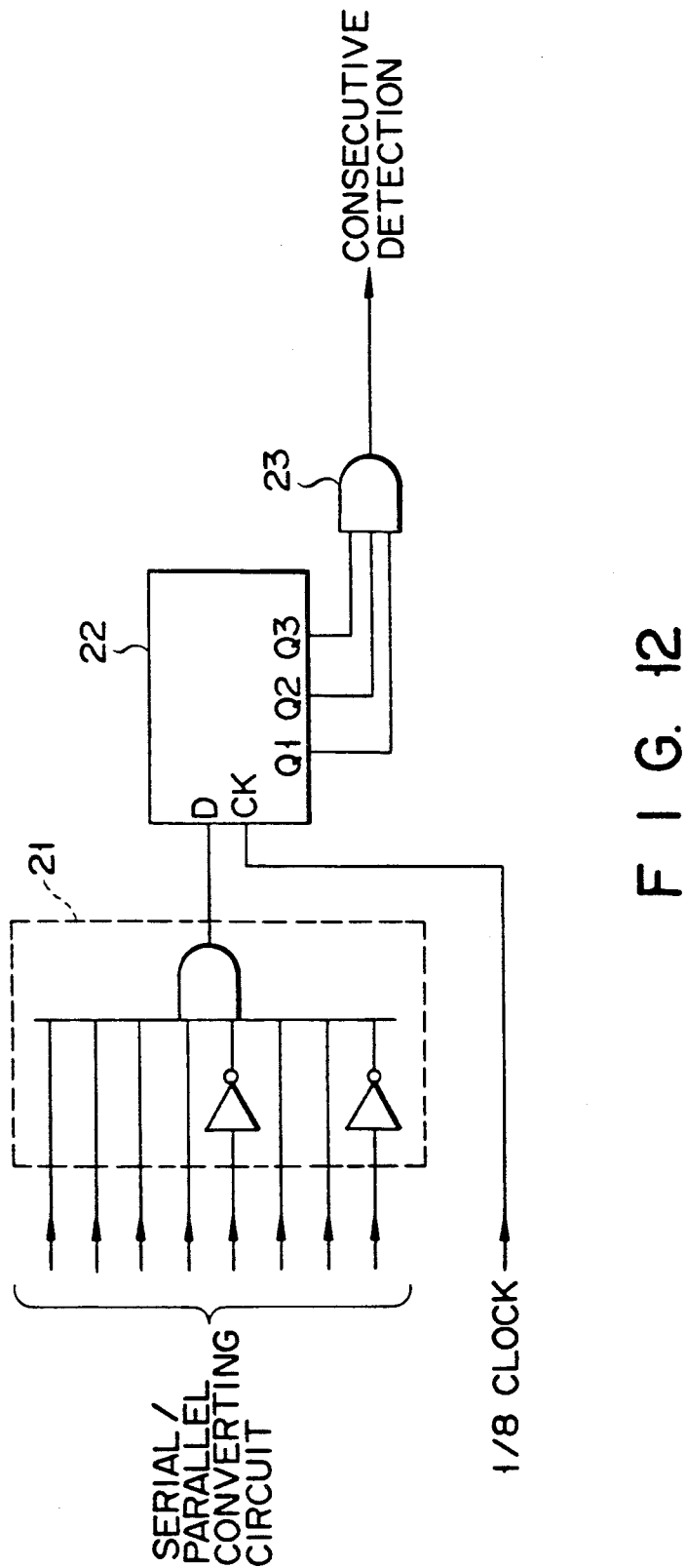
F I G. 12

FRAME SYNCHRONIZATION CIRCUIT

BACKGROUND OF THE INVENTION

1. Field of the Invention

This invention relates to a frame synchronization circuit for generating a timing signal in synchronism with each frame of data received, and more particularly to a frame synchronization circuit which performs a resynchronization by means of a plurality of detectors for detecting a synchronization code pattern, thereby to achieve high-speed operation and decrease the synchronization establishing time.

2. Description of the Related Art

In a frame synchronization circuit, it is necessary to decrease the synchronization establishing time. Various methods for decreasing this time have been proposed, among which is the immediate shift method, known in the art as a typical method for this purpose. In this method, the phase of a frame synchronization code in data received is compared with that of a frame pulse generated in the reception side. If they are inconsistent, the clock of a frame pulse generating counter, for example, is stopped, thereby immediately shifting the relative phase of the frame synchronization code and the frame pulse. In the next time slot, these phases are compared in the same manner. In the immediate shift method, a sequence of operations, i.e., synchronization detection, phase comparison, and phase shifting, must be completed within one time slot. Hence, when data is transmitted at high speed, such as hundreds of megabits per second, it is difficult to perform these operations within one time slot.

To decrease the synchronization establishing time and to achieve high speed operation, synchronization reset processing by means of detecting frame synchronization codes in parallel from a series of data signals has been proposed, as in Published Unexamined Japanese Patent Applications (PUJPAs) Nos. 50-102206, 63-245032, and 63-107247.

FIG. 1 shows a frame synchronization circuit for performing synchronization reset processing. The circuit comprises a serial/parallel converting circuit 1, a synchronization code detecting circuit 2 constituted by an M number of pattern detectors #1 to #M, a selection signal generating circuit 3, selector 4, a timing control circuit 5 for generating a frame pulse, and a synchronization protecting circuit 6.

The serial/parallel converting circuit 1 has a serial-in/parallel-out shift register (SR) 11 of 2M−1 bits, a parallel-in/parallel-out parallel register (PR) 12 of 2M-1 bits, and a 1/M frequency divider 13. M denotes the number of bits in one block used when data is processed in blocks.

For example, if M=8, the serial/parallel converting circuit 1 converts a series of data (including a frame synchronization code), input into the frame synchronization circuit, to a 15-bit parallel signal. In this case, since the output of the ¼ frequency divider 13 does not synchronize with the frame synchronization code in the input data, from what parallel output terminals each bit of the frame synchronization code is output is determined depending on the phase of the output from the frequency divider. More specifically, if M=8, eight different signals can be output from the serial/parallel converting circuit 1; that is, the pattern of the frame synchronization code may occupy first to eighth bits, second to ninth bits, ... or eighth to fifteenth bits of the parallel signal. The output of the serial/parallel converting circuit 1 is supplied to the synchronization code detecting circuit 2, and input to eight pattern detectors #1 to #8. Bit signals constituted by first to eighth bits, second to ninth bits, ... or eighth to fifteenth bits, are sequentially input to the respective pattern detectors #1 to #8. Each pattern detector detects a predetermined pattern of a frame synchronization code. The outputs of the pattern detectors #1 to #8 are supplied to the selection signal generating circuit 3.

The selection signal generating circuit 3 calculates a logical sum of the outputs of the synchronization pattern detectors #1 to #8 and outputs a synchronization detecting pulse to the synchronization protecting circuit 6. The selection signal generating circuit 3 also generates a selection signal corresponding to the serial number of the pattern detector which detects the frame synchronization code, on the basis of a control signal supplied from the synchronization protecting circuit 6. The selection signal is supplied to the selector 4. The selector 4 calculates a logical product of the 15-bit parallel data output from the serial/parallel converting circuit 1 and the selection signal supplied from the selection signal generating circuit 3. As a result, 8-bit parallel data corresponding to the detected bit position of the pattern of the frame synchronization code is selectively output on the basis of 15-bit parallel data.

The synchronization protecting circuit 6 compares the phase of the synchronization detecting pulse with that of a frame pulse generated by the timing control circuit and performs a synchronization protecting operation. At this time, if the circuit is set in a hunting mode, the counter in the timing control circuit 5 is reset to correct the phase of the frame pulse.

The above-described frame synchronization method of a parallel detection type is advantageous in that the operation rate required for performing synchronization detection, phase comparison, and phase shifting can be 1/M of that in the immediate shift method, and the synchronization reset time is as short as that in the immediate shift method. However, this method has a drawback in that the synchronization code is inevitably large. The drawback becomes more prominent as the number of bits of a frame synchronization code increases.

For example, FIG. 2 shows a frame synchronization code used in a new synchronization network, standardization of which the CCITT (International Telegraph and Telephone Consultative Committee) is proceeding with. The frame synchronization code of a basic signal called STM-1 is constituted by 48 bits. The frame synchronization code of a signal STM-N (N: the number of multiplication) obtained by multiplexing the signal STM-1 is constituted by 48×N bits. If the frame synchronization method of a parallel detection type is applied to the new synchronization network, eight synchronization pattern detectors will be required (M=8), since the new synchronization network is usually based on byte processing. Assuming that all of the synchronization codes of STM-16 are to be detected, eight pattern detectors each constituted by 768 bits are required. Thus, the entire circuit is very large. In order to avoid increasing the size of the circuit, circuit integration is required. However, even if the circuit is integrated into an IC chip, the IC chip will inevitably be accompanied by the drawback of a low operation speed due to the delay time caused by the increase of wiring, also resulting in high power consumption.

As described above, although the conventional frame synchronization circuit of a parallel detection type is advantageous in that the re-synchronization can be performed at high rate, it has the drawback that the synchronization code detecting circuit must be large in accordance with the increase in the number of bits of the frame synchronization code, thereby increasing power consumption.

SUMMARY OF THE INVENTION

It is an object of the present invention to provide a frame synchronization circuit in which resynchronization operations can be performed at high speed, and the size of the synchronization code detecting circuit can be small, thereby decreasing power consumption.

According to the present invention, there is provided a frame synchronization circuit comprising: serial/parallel converting means for converting a serial data signal having blocks each constituted by an M number of bits (M: a natural number) to a parallel data signal of 2M-1 bits on the basis of a reference clock, the format of said serial data signal having a frame synchronization code of a specific pattern constituted by a plurality of continuous blocks concentrated in a frame; first synchronization detecting means comprising an M number of M-bit pattern detectors supplied with M-bit data signals selected from the parallel data signal of 2M-1 bits output from said serial/parallel converting means, said M-bit data signals occupying portions of the parallel data signal of 2M-1 bits shifted in sequence by 1 bit starting from a reference bit selected from the least significant bit and the most significant bit, said M-bit pattern detectors being respectively allotted to the bit portions, each of said pattern detectors detecting whether the supplied signal corresponds to the code pattern of the first block of said frame synchronization code; selection signal generating means for holding outputs of said pattern detectors of said first synchronization detecting means and outputting them as a selection signal when a switch control signal is of a first level, and maintaining outputs of said pattern detectors immediately before the switch control signal is changed to a second level and outputting the maintained data as a selection signal; delay means for delaying an output of said serial/parallel converting means by at least the time required for the operations of said first synchronization detecting means and said selection signal generating means; selection means for receiving a selection signal output by said selection signal generating means, discriminating what pattern detector detects the code pattern of the first block of said frame synchronization code, and selectively outputting an M-bit data signal corresponding to the bit portion allocated to the discriminated pattern detector; second synchronization detection means for detecting at least a main pattern of the frame synchronization code from the output of said selection means; timing control means for generating a frame pulse for every frame on the basis of the reference clock, the timing of generation of a frame pulse being controlled on the basis of a phase control signal; and synchronization protecting means including: phase comparing means for comparing the phase of an output of said second synchronization detecting means and that of a frame pulse signal generated by said timing control means; discriminating means for discriminating a synchronous state, asynchronous state, and a hunting state on the basis of the result of comparison in said phase comparing means, said discriminating means discriminating a synchronous state when detecting that these phases coincide consecutively a predetermined number of times on the basis of the result of the comparison, an asynchronous state when detecting that these phases do not coincide consecutively a predetermined number of times on the basis of the result of the comparison, and a hunting state when detecting that these phases do not coincide in the asynchronous state; and control means for transmitting an output of said second synchronization detecting means to said timing control means as a phase control signal for the frame pulse, and also transmitting a switch control signal of a first level to said selection signal generating means when said discriminating means discriminates a hunting state, and a switch control signal of a second level to said selection signal generating means when said discriminating means discriminates another state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram showing outputs of the serial/parallel converting circuit shown in FIG. 3;

FIG. 5 is a circuit diagram showing details of the selection signal generating circuit shown in FIG. 3;

FIG. 9 is a circuit diagram showing details of the synchronization protecting circuit shown in FIG. 3;

FIG. 12 is a circuit diagram showing details of the first synchronization code detecting circuit shown in FIG. 3.

DETAILED DESCRIPTION OF THE PREFERRED EMBODIMENTS

An embodiment of the invention will be described with reference to FIGS. 3 to 12.

Figure 1:
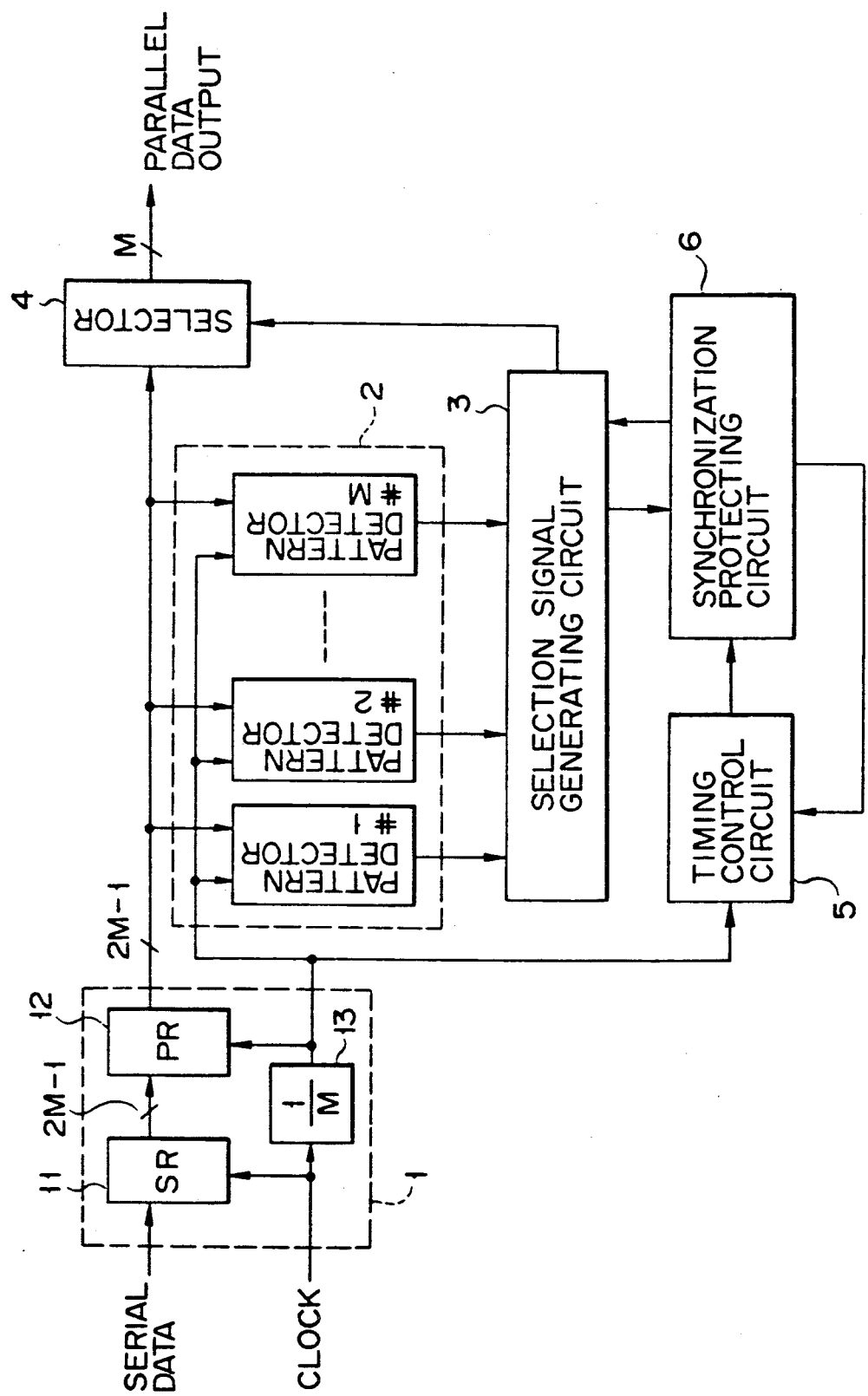
FIG. 1 is a block diagram showing a conventional frame synchronization circuit.
Figure 2:
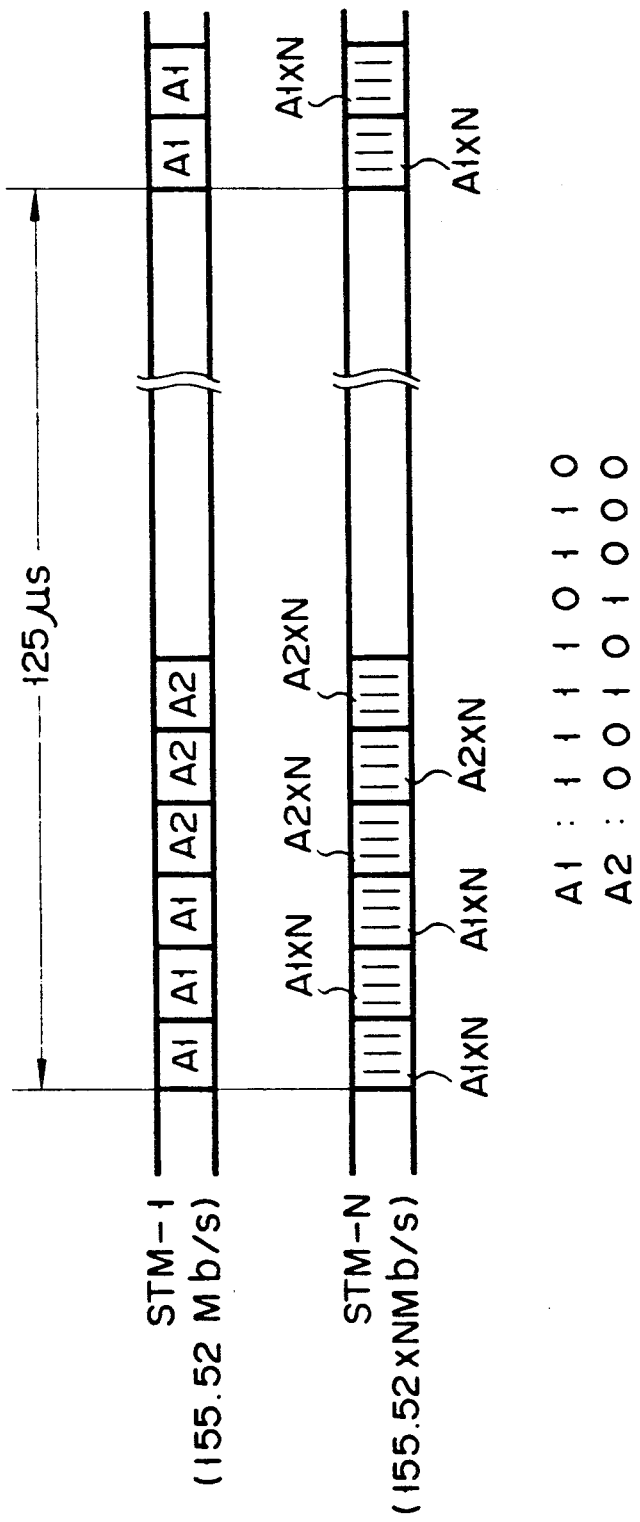
FIG. 2 is a diagram showing an example of a frame synchronization code.
Figure 3:
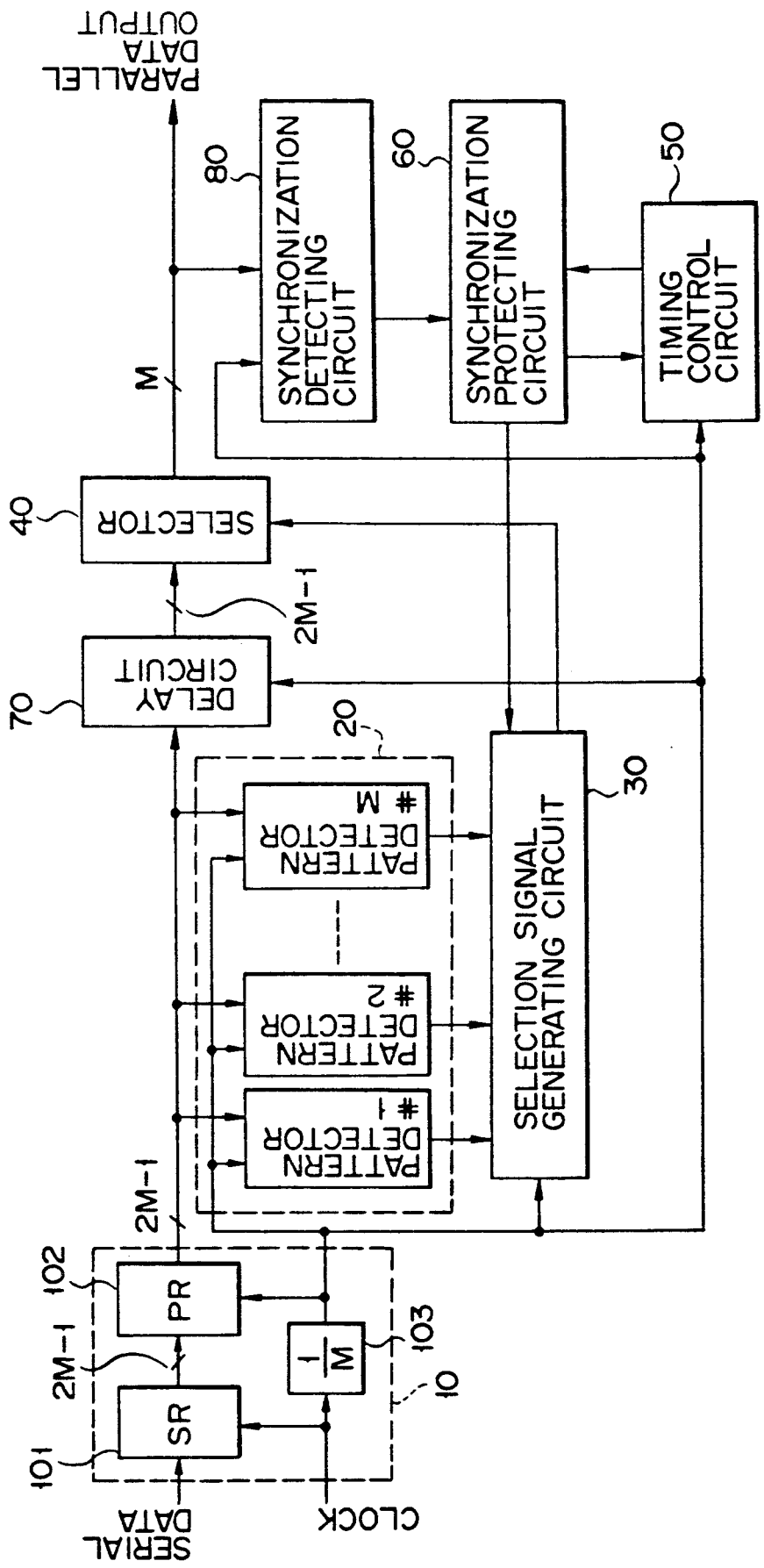
FIG. 3 is a block diagram showing a frame synchronization circuit according to an embodiment of the present invention.

FIG. 3 shows the entire structure of the frame synchronization circuit according to the invention. The circuit comprises a serial/parallel converting circuit 10, a first synchronization code detecting circuit 20 constituted by an M number of pattern detectors #1 to #M, a selection signal generating circuit 30, a delay circuit 70, a selector 40, a timing control circuit 50 for generating a frame pulse, a synchronization protection circuit 60, and a second synchronization code detecting circuit 80. For convenience of explanation, it is premised that the frame synchronization code is constituted by blocks A1 and A2 as shown in FIG. 2 and the number (M) of bits in one block is 8.

The serial/parallel converting circuit 10 includes a serial-in/parallel-out shift register (SR) 101 of 2M-1 bits, a parallel-in/serial-out parallel register (PR) 102 of 2M-1 bits, and a 1/M frequency divider 103. M denotes the number of bits in one block used when data is processed in blocks.

The serial/parallel converting circuit 10 converts serial data to a parallel signal of 15 bits, which is input to the delay circuit 70 and the first synchronization code detecting circuit 20. The first synchronization code detecting circuit 20 detects a code pattern of the first block A1 of the frame synchronization code in parallel by means of the pattern detectectors #1 to #8. FIG. 4 shows the state of the A1 pattern (the code pattern of the block A1) in the 15-bit signal generated at the output terminals (P1–P15) of the serial/parallel converting circuit 10. In FIG. 4, $\phi 1$ to $\phi 8$ denote phases of the frequency divider 103, P1 to P15 denote the serial numbers of the output terminals of the serial/parallel converting circuit 10, and X denotes data other than the frame synchronization code.

As is shown in FIG. 4, the position of the A1 pattern in the 15-bit signal varies in accordance with the initial phase ($\phi 1$ to $\phi 8$) of the $\frac{1}{8}$ frequency divider 103. Hence, in the first synchronization code detecting circuit 20, decoders are provided in the positions corresponding to the bit positions in accordance with the phases $\phi 1$ to $\phi 8$ in order to detect the A1 pattern. The detection result is output to the selection signal generating circuit 30. The selection signal generating circuit 30 generates a selection signal on the basis of the output of each of the pattern detectors #1 to #8, and supplies it to the selector 40.

FIG. 5 shows details of the selection signal generating circuit 30. The circuit comprises a latch 31, an OR gate 32, and an S-R flip-flop 33. Input signals DET1 to DET8 are the outputs of the pattern detectors #1 to #8, and are respectively supplied to input terminals D1 to D8 of the latch 31. It is premised that the outputs DET1 to DET8 of the pattern detectors #1 to #8 are set at an H (high) level in an A1 pattern detecting period, and an L (low) level in another period.

The latch 31 transfers signals which are supplied to the input terminals D1 to D8 respectively to the output terminals Q1 to Q8 (transfer state), when an enable terminal EN is set at the L level. When the enable terminal EN is set at the H level, the latch 31 operates so as to maintain the output state immediately before the enable terminal EN becomes H level (memory state). When the A1 pattern is detected and one of the outputs DET1 to DET8 rises to the H level, the output of the OR gate 32 reaches an active state (H level) and the flip-flop 33 is set so as to change the output at the enable terminal EN from L level to H level. This change of the state at the enable terminal EN delays the change of the outputs DET1 to DET8 by a time required to transfer a signal from the OR gate 32 to the flip-flop 33. Hence, the latch 31 reads the states of the outputs DET1 to DET8 when the A1 pattern is detected, and maintains these states upon detection of a change from L level to H level at the enable terminal EN. Thus, the detection results DET1 to DET8 of the pattern detectors #1 to #8 stored by latch 31 are supplied to the selector 40 as selection signals SL1 to SL8.

Figure 6:
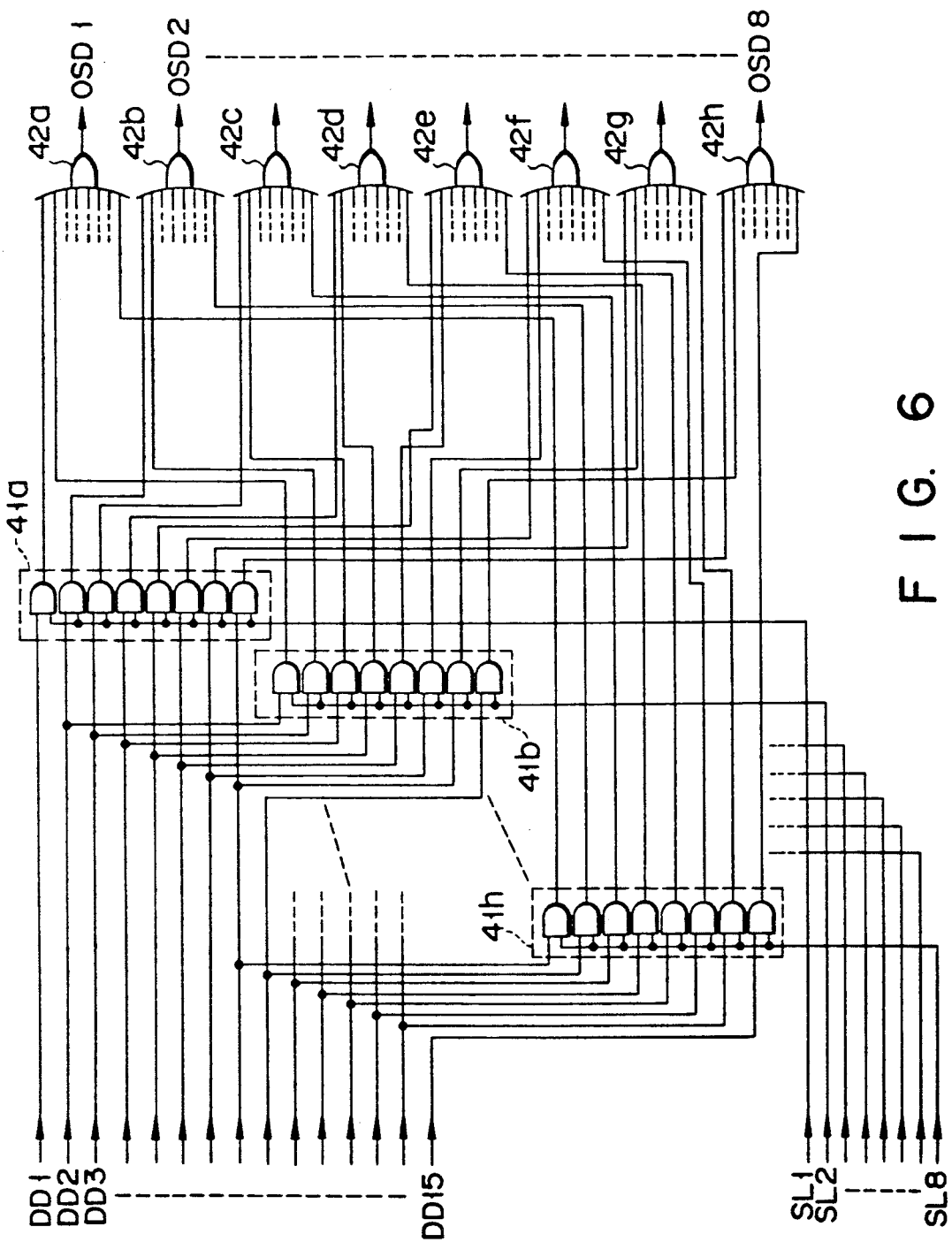
FIG. 6 is a circuit diagram showing details of the selector shown in FIG. 3.

The selector 40 selects 8-bit data corresponding to the bit position of the A1 pattern from 15-bit data output by the delay circuit 70, as shown in FIG. 3. FIG. 6 shows details of the selector 40. The selector 40 comprises AND gates 41a to 41h, and OR gates 42a to 42h. To make the drawing simple, AND gates 41c to 41g are not shown in FIG. 6. Input signals DD1 to DD15 are 15-bit data obtained by delaying the output of the serial/parallel converting circuit 10 by means of the delay circuit 70, and correspond to data output from the terminals P1 to P15 shown in FIG. 4. The input signals SL1 to SL8 are the above-described selection signals.

The AND gates 41a to 41h extract eight types of 8-bit data rows from the 15-bit input data, the data rows being shifted by 1 bit, starting from a reference bit selected from the least significant bit and the most significant bit. The AND gate 41a gates the signals DD1 to DD8 with the selection signal SL1, the AND gate 41b gates the signals DD2 to DD9 with the selection signal SL2, the AND gate 41c gates the signals DD3 to DD10 with the selection signal SL3. The AND gates 41d to 41h perform gate processing in the same manner. The data of eight bits of the signal row output from each of the AND gates 41a to 41h are respectively supplied to the OR gates 42a to 42h in accordance with the serial numbers of the bits. More specifically, data in the first bits of the AND gates 41a to 41h are collected at the OR gate 42a, and data in the second bits thereof to the OR gate 42b. Similarly, data in the third to eighth bits thereof are respectively collected at the OR gates 42c to 42h. Each of the OR gates 42a to 42h calculates and outputs the logical sum of input data of the eight bits.

As described above, only the selection signal corresponding to the output of the pattern detector, which detects the A1 pattern, is set to H level. Therefore, in the above structure, by virtue of the operations of the gates 41a to 41h, the selector 40 can select the data rows corresponding to the bit position of the synchronization code from the 15-bit data output from the serial/parallel converter. Thus, the selector 40 can output data synchronized in blocks.

The delay circuit 70 delays data transference to the selector by the time required for the data processing in the synchronization code detecting circuit 20 and the selection signal generation circuit 30, in order to prevent omission of a bit of the synchronization code which may be caused by operation of the selector 40 while the block A1 is being input.

The operations of the second synchronization code detecting circuit 80, the synchronization protecting circuit 60, and the timing control circuit 50 will now be described.

Figure 7:
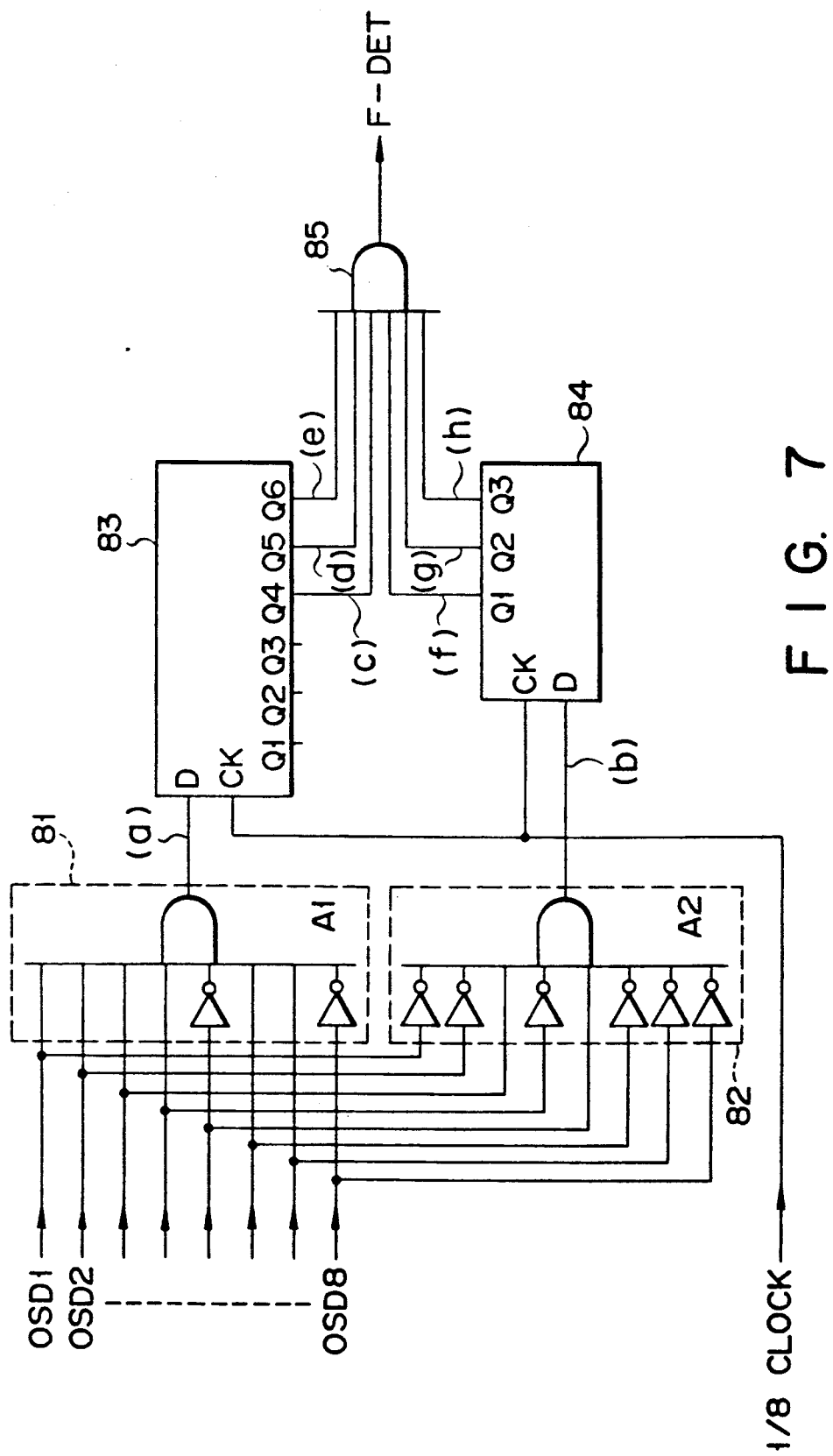
FIG. 7 is a circuit diagram showing details of the second synchronization code detecting circuit shown in FIG. 3.
Figure 8:
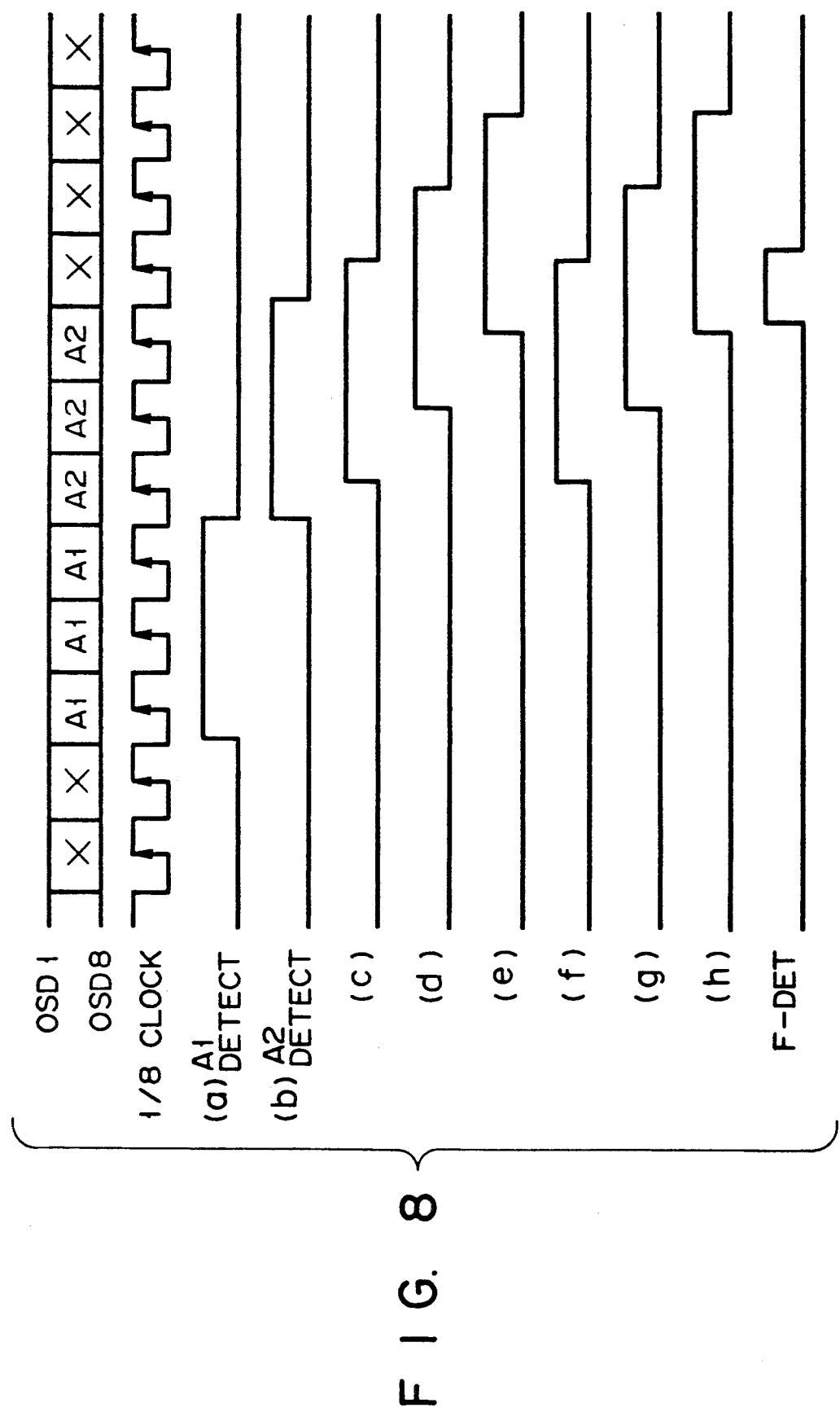
FIG. 8 is a timing chart showing the relationship among operation timings at a number of points shown in FIG. 7.

The second detecting circuit 80 detects all patterns or a main pattern of the frame synchronization code from the data output by the selector 40, and outputs the detection result to the synchronization protecting circuit 60. FIG. 7 shows details of the second synchronization detecting circuit 80 and FIG. 8 shows the relationship among operation timings at a number of points shown in FIG. 7. FIGS. 7 and 8 illustrate a case where a synchronization code pattern A1.A1.A1.A2.A2.A2 is to be detected.

As shown in FIG. 7, the second detecting circuit 80 comprises an A1 pattern detector 81, an A2 pattern detector 82, a 6-bit shift register 83, a 3-bit shift register 84, and a 6-input AND gate 85. Data OSD1 to OSD8 output from the selector 40 are input to the circuit 80. Since the data OSD1 to OSD8 are synchronized in blocks, the A1 and A2 pattern detectors 81 and 82 can easily detect the synchronization code patterns of the blocks A1 and A2. In other words, the A1 and A2 patterns, which are detected by the detectors 81 and 82 at different times, are delayed by the shift registers 83 and 84 and supplied to the AND gate 85. The AND gate 85 calculates the logical products of the delayed outputs, thereby detecting a synchronization code pattern F-DET A1.A1.A1.A2.A2.A2).

Figure 10:
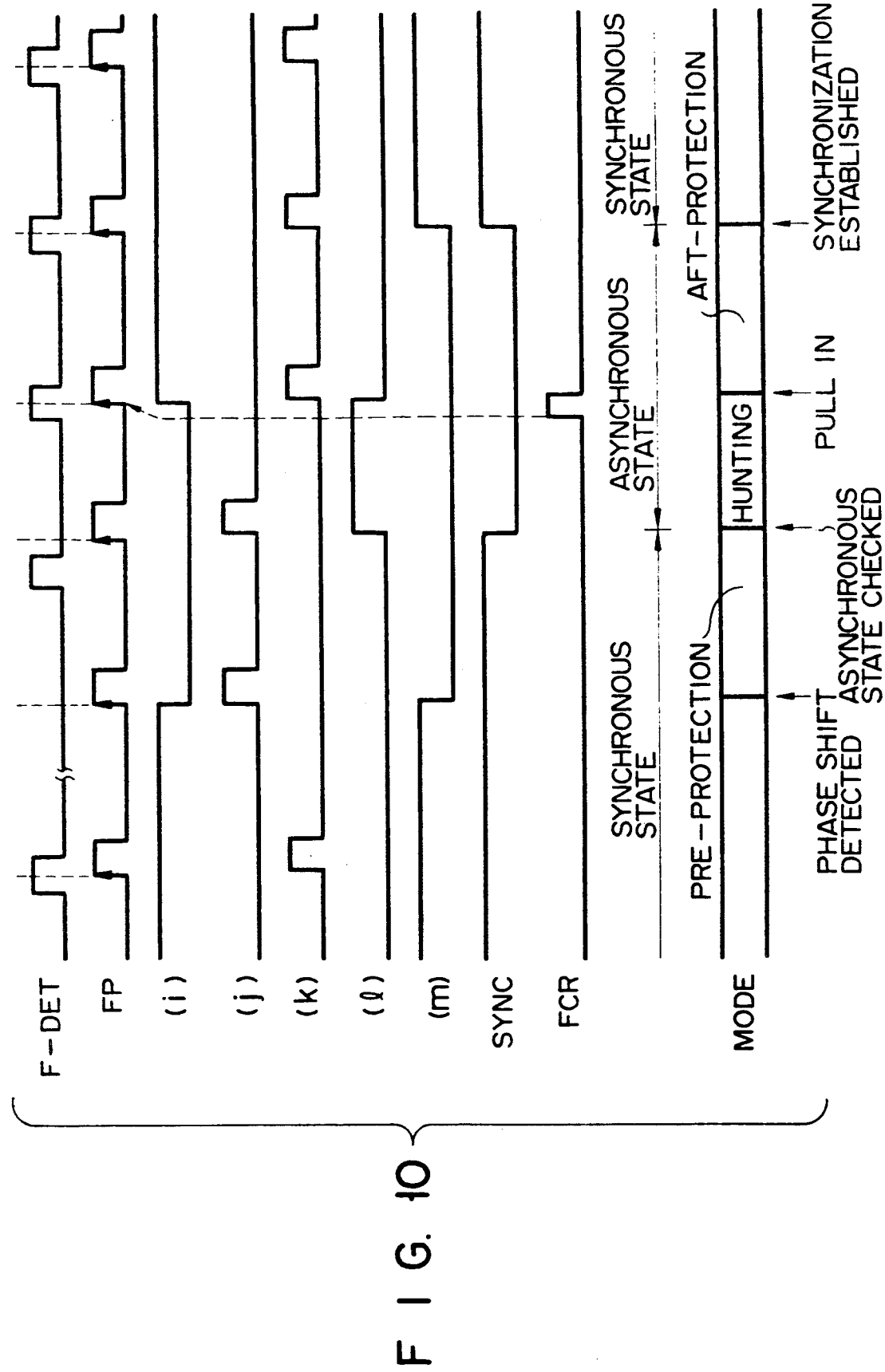
FIG. 10 (is a timing chart showing the relationship among operation timings at a number of points shown in FIG. 9.

The output of the second synchronization code detector 80 thus obtained is input to the synchronization protecting circuit 60, which compares the phase of the output of the synchronization code detecting circuit 80 and that of the frame pulse generated by the timing control circuit 50, and counts the numbers of coincidence and non-coincidence, thus performing a synchronization protecting operation. FIG. 9 shows details of the synchronization protecting circuit 60, and FIG. 10 shows the relationship among operation timings at a number of points shown in FIG. 9.

As shown in FIG. 9, the synchronization protecting circuit 60 comprises a D flip-flop 61 AND gates 62 and 63, an aft-protection (coincidence) counter 64, a preprotection (non-coincidence) counter 65, rise differential circuits 66 and 67, an S-R flip-flop 68, and AND gates 69a and 69b. The output F-DET of the second synchronization detecting circuit 80 and the frame pulse FP are input to the circuit 60. The S-R flip-flop 68 outputs a signal SYNC representing a frame synchronous state in which the signal SYNC is set at an H level, and a frame asynchronous state in which the signal SYNC is set at an L level. The AND gate 69a outputs a signal FCR for resetting the frame counter in the timing control circuit 50, thereby initializing the phase of the frame pulse, while the AND gate 69b outputs a signal HUNT representing a hunting mode, which is supplied to the selection signal generating circuit 30, together with the signal SYNC.

The D flip-flop 61 discriminates the logical level of the synchronization detection pulse F-DET when the frame pulse FP rises. If the logical level is an H level, the D flip-flop 61 determines the phase coincidence, and if an L level, the phase non-coincidence. The AND gates 62 and 63 split clocks o the aft-protection counter 64 and the pre-protection counter 65 in accordance with the determination results. The aft- and pre-protection counters 64 and 65 feed back their count outputs to the counter enable terminals CEN. When the count results reach predetermined values, which correspond to the number of times synchronization is confirmed in the aft- and pre-protection modes, the counters 64 and 65 stop counting and maintain the count results. FIG. 9 shows a case in which the predetermined values are both two.

(The outputs from the terminals QB are fed back to the terminals CEN.)

The clocks are input to the clock terminals CK of the aft- and pre-protection counters 64 and 65 by the AND gates 62 and 63, respectively. The clock terminal CK of the aft-protection counter 64 is connected to the reset terminal of the pre-protection counter 65 and the clock terminal CK of the pre-protection counter 65 is connected to the reset terminal R of the aft-protection counter 64. The aft-protection counter 64 counts the number of times of phase coincidence, and the pre-protection counter 65 counts that of phase non-coincidence.

The timing chart of FIG. 10 shows the operation states of the synchronization protection circuit 60 changing from a synchronous state via an asynchronous state to a synchronous state again. More specifically, in a synchronous state, when the D flip-flop 61 detects non-coincidence of the synchronization detection pulse F-DET and the pulse FP, the synchronization protecting circuit 60 is set in a pre-protection mode, and the protection counter 65 starts its counting operation. Then, when non-coincidence is consecutively detected twice, the flip-flop 68 is reset and the synchronization protecting circuit 60 is changed to an asynchronous state. When the synchronous state is changed into the asynchronous state, the frame synchronization circuit 60 is set in a hunting mode for detecting a synchronization protecting code, and the AND gate 69a is opened so as to receive the synchronization detecting pulse F-DET When a frame synchronization code is detected and the pulse F-DET is generated, the frame counter in the timing control circuit 50 is reset in synchronism with the generation of the pulse F-DET. The phase of the frame-pulse FP is corrected upon resetting of the frame counter, and the logical level of the synchronization detection pulse F-DET is discriminated using the corrected frame pulse FP. When the phase coincidence (H level) is detected, frame synchronization circuit is set in a aft-protection mode, and the aft-protection counter 64 starts its counting operation. When coincidence is consecutively detected twice, the flip-flop 68 is set and the frame synchronization circuit is returned to a synchronous state.

In association with the frame synchronization protecting operation as described above, the selection signal generating circuit 30 holds or does not hold a selection signal, thereby achieving re-synchronization in blocks. The re-synchronization operation will be described below with reference to FIG. 5.

As shown in FIG. 5, the selection signal generating circuit 30 comprises a fall differential circuit 35 having a delay element (DL), inverter, and an AND gate. The differential circuit 35 detects the fall of the SYNC signal supplied from the synchronization protecting circuit 60. The detected signal is output to the reset terminal R of the S-R flip-flop 33 via the OR gate 34. The flip-flop 33 generates an enable signal to be supplied to the latch 31, and controls the latch 31 so as to hold or not hold the selection signal. Hence, the holding of the selection signal is released when the SYNC signal is changed from H level to L level, i.e., when a synchronous state is changed into an asynchronous state, at which time the frame synchronization circuit is set in a hunting mode and another A1 pattern can be detected, thus performing a re-synchronization operation.

A circuit constituted by elements 301 to 306 shown in FIG. 5 prevents erroneous synchronization caused by recognizing an A1 pattern included in data as the head of the synchronization code. This circuit detects by a timer function whether the hunting mode is changed into the aft-protection mode within a predetermined period of time, after the first synchronization code detecting circuit 20 has detected the A1 pattern. If the hunting mode is not changed to the aft-protection mode within a predetermined period of time, the circuit determines erroneous synchronization and releases the selection signal from the latch 31.

In FIG. 5, reference numeral 301 denotes an S-R flip-flop, 302 and 304 denote AND gates, and 303 denotes a counter incorporating a decoder which generates an output signal in counting 10 and serves as a timer. Reference numeral 305 denotes an OR gate, and 306 a fall differential circuit.

Figure 11:
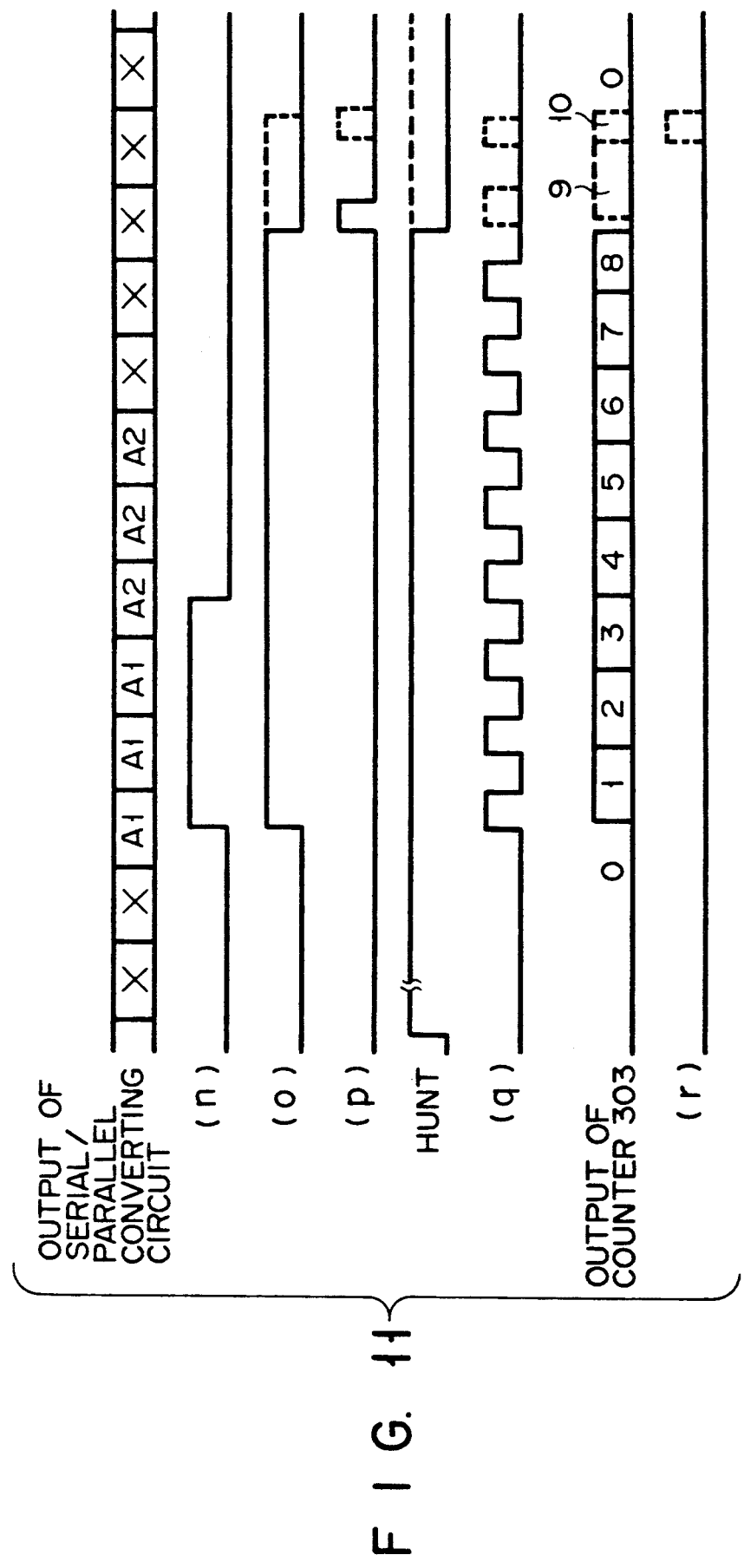
FIG. 11 is a timing chart for explaining the operations of the circuit shown in FIG. 5.

The operation of the circuit will not be described with reference to the timing chart shown in FIG. 11. In the timing chart, solid lines represent correct block synchronization, and broken lines represent erroneous synchronization. When the first synchronization code detecting circuit 20 detects an A1 pattern, the flip-flop 301 is set, with the result that the AND gate 302 supplies a clock to the counter 303.

In the case of correct block synchronization, a synchronization detection pulse F-DET is output after a lapse of the delay time generated by the operations of the delay circuit and the selector 40 and the operation time of the second synchronization code detection circuit 80 since the detection of the A1 pattern. As a result, the frame synchronization circuit is changed from hunting mode to back protection mode. At the same time, the signal HUNT output from the synchronization protecting circuit 60 is changed from H level to L level. The fall differential circuit 306 detects the fall of the HUNT signal, and the detected signal is supplied through the OR gate 305 to the counter 303 and the flip-flop 301, so as to reset them. The timing chart of FIG. 11 shows the state in which the signal HUNT falls when the counter 303 counts eight, with the result that the counter 303 is reset.

On the other hand, in the case of erroneous synchronization, since the second synchronization Code detection circuit 80 does not detect a frame synchronization code, the HUNT signal is maintained at the H level. The counter 303 generates an output signal upon counting ten, thereby resetting itself and the flip-flop 301 to initial states. The ten-count output of the counter 303 is gated by the AND gate 304. However, since the HUNT signal is H level, the ten-count output of the counter passes through the AND gate 304, and is supplied through the OR gate 34 to the flip-flop 33 to reset it. Since the flip-flop 33 controls the operation state of the latch 31 as described above, the latch 31 is changed from the memory state to the transfer state upon resetting of the flip-flop 33. In this state, when another frame synchronization signal is input, a new state of eight-bit output of the first synchronization code detection circuit 20 is restored into the latch 31. Thus, a correct selection signal can be output from latch 31.

As has been described above, the frame synchronization circuit of the present invention is structured so that the code pattern of the first block of a frame synchronization code is detected to achieve block synchronization, all of the code patterns or a main pattern can be detected on the basis of the block-synchronized data, and a synchronization protecting operation is performed in accordance with the detected result. According to the invention, since the code pattern of only the first block of a frame synchronization code is detected by the pattern detectors arranged in parallel, the synchronization code detecting circuit can be small. If the synchronization code detecting circuit is small, erroneous block synchronization may easily occur. However, in the circuit of the invention, since erroneous block synchronization is detected by the timer function and re-synchronization is achieved, it does not affect the operation of the circuit.

During the operation of the timer, it is difficult to detect a correct frame synchronization code. Although the time required for the operation of the timer is very short, it degrades the re-synchronization characteristic. To obtain a re-synchronization characteristic having a higher speed, it is only necessary to improve the detecting accuracy of each of the pattern detectors #1 to #8 of the first synchronization code detecting circuit 20, thereby reducing the occurrence of erroneous synchronization. For example, pattern-detecting accuracy can be improved by consecutively detecting the A1 pattern twice or three times using the structure as shown in FIG. 12. (FIG. 12 shows an example in which the A1 pattern is consecutively detected three times.) In the structure of FIG. 12, the output of an A1 pattern detector 21 is shifted by a shift register 22, and an AND gate 23 calculates the logical product of outputs of the shift register 22.

This invention is not limited to the above embodiment. For example, the number of parallel outputs of the serial/parallel converter 10, the number of the pattern detectors in the first synchronization code detecting circuit 20, and the like can suitably be modified in accordance with the transmission system to which the present invention is applied. Further, each of the elements of the embodiment can be replaced by a circuit performing the same function as those in the embodiment. For example, the timer of the selection signal generating circuit 30 can be constituted by a one-shot multivibrator. Thus, various modifications can be made within the scope of the invention. As has been described above, according to the present invention, the following advantages can be obtained.

First, since the synchronization code detection circuit including the pattern detectors arranged in parallel detects only the pattern of the first block of a frame synchronization code, the size of the detection circuit can be smaller than in the conventional frame synchronization circuit of parallel detection type which detects all of the patterns of a frame synchronization code, reducing power consumption. Moreover, since the number of wires decreases and the operation delay also decreases, the operation speed can be higher. Hence, the present invention is effective in particular when applied to a transmission system using a frame synchronization code of a large number of bits.

Second, since erroneous block synchronization is prevented by using a timer, the re-sychronization characteristic is not significantly degraded. Therefore, it is possible to perform a re-synchronization operation within one frame, i.e., substantially the same period as required in the conventional frame synchronization circuit of a parallel detection type.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A frame synchronization circuit comprising:

serial/parallel converting means for converting a serial data signal having blocks each constituted by an M number of bits (M: a natural number) to a parallel data signal of 2M-1 bits on the basis of a reference clock, the format of said serial data signal having a frame synchronization code of a specific pattern constituted by a plurality of continuous blocks concentrated in a frame;

first synchronization detecting means comprising an M number of M-bit pattern detectors supplied with M-bit data signals selected from the parallel data signal of 2M-1 bits output from said serial/parallel converting means, said M-bit data signals occupying portions of the parallel data signal of 2M-1 bits shifted in sequence by 1 bit starting from a reference bit selected from the least significant bit and the most significant bit, said M-bit pattern detectors being respectively allotted to the bit portions, each of said pattern detectors detecting whether the supplied signal corresponds to the code pattern of the first block of said frame synchronization code;

selection signal generating means for generating a selection signal, said selection signal generating means including a memory means which is allowed to store data when a memory control signal is in an active state, and stores outputting states of said M number of M-bit pattern detectors of said first synchronization detecting means when a detecting signal is output from one of said M number of M-bit pattern detectors of said first synchronization-detecting means, the stored result being represented by said selection signal;

delay means for delaying an output of said serial/parallel converting means by at least the time required for the operations of said first synchronization detecting means and said selection signal generating means;

selection means for receiving 2M-2 bit parallel data output from said delay means, separating said 2M-1 bit parallel data into M number of groups of M-bit parallel data which correspond to detecting bit portions allocated to said M number of M-bit pattern detectors of said first synchronization detecting means, selecting only M-bit parallel data of a group corresponding to bit portions allocated to the pattern detector that detects said frame synchronization code in accordance with the selection signal output from said signal generating means, from among said M number of groups, and outputting the selected data;

second synchronization detection means for detecting at least a main pattern of the frame synchronization code from the output of said selection means;

timing control means for generating a frame pulse for every frame on the basis of the reference clock, the timing of generation of a frame pulse being controlled on the basis of a phase control signal; and synchronization protecting means including:

phase comparing means for comparing the phase of an output of said second synchronization detecting means and that of a frame pulse signal generated by said timing control means;

discriminating means for discriminating a synchronous state, an asynchronous state, and a hunting state on the basis of the result of comparison in said phase comparing means, said discriminating means discriminating a synchronous state when detecting that these phases coincide consecutively a predetermined number of times on the basis of the result of the comparison, an asynchronous state when detecting that these phases do not coincide consecutively a predetermined number of times on the basis of the result of the comparison, and a hunting state when detecting that these phases do not coincide in the asynchronous state;

first control means for transmitting a detecting output of said second synchronization detecting means to said timing control means as said phase control signal for the frame pulse when said discriminating means discriminates a hunting state; and second control means for generating said memory control signal to be transmitted to said selection signal generating means, and making said memory control signal in said active state when said discriminating means discriminates a synchronization state or a hunting state.

2. A frame synchronization circuit according to claim 1, wherein said selection signal generating means holds the selection signal upon detection of the synchronization code pattern by said first synchronization detecting means when said discriminating means of said synchronization protecting means discriminates a hunting state, and releases the holding state of the selection signal if said phase comparing means of said synchronization protecting means does not detect phase coincidence within a predetermined period of time.

3. A frame synchronization circuit according to claim 1, wherein said pattern detectors of said first synchronization detecting means detect that the code pattern of the first block of a frame synchronization code is repeated a plurality of times.

* * * * *